Oct. 27, 1964  J. F. SHANNON  3,154,472
ROD DRIVE FOR NUCLEAR REACTOR
Filed March 7, 1960  5 Sheets-Sheet 1

INVENTOR.
JACK F. SHANNON
BY
ATTORNEY

Oct. 27, 1964

J. F. SHANNON 3,154,472

ROD DRIVE FOR NUCLEAR REACTOR

Filed March 7, 1960

INVENTOR.
JACK F. SHANNON
BY
*Jack F. Luhra*
ATTORNEY

INVENTOR.
JACK F. SHANNON
BY
John F. Kuhro
ATTORNEY

Oct. 27, 1964   J. F. SHANNON   3,154,472
ROD DRIVE FOR NUCLEAR REACTOR
Filed March 7, 1960   5 Sheets-Sheet 4

INVENTOR.
JACK F. SHANNON
BY
John F. Luhrs
ATTORNEY

United States Patent Office 3,154,472
Patented Oct. 27, 1964

3,154,472
ROD DRIVE FOR NUCLEAR REACTOR
Jack F. Shannon, Euclid, Ohio, assignor to Bailey Meter Company, a corporation of Delaware
Filed Mar. 7, 1960, Ser. No. 13,234
15 Claims. (Cl. 176—36)

This invention relates to control apparatus for nuclear reactors and more particularly to a drive for positioning the control rod of a nuclear reactor.

The operation of a nuclear reactor is ordinarily controlled by positioning one or more control rods in the reactor to effect a change in the reaction rate by changing the effective multiplication constant and hence the reaction rate's time derivative. The term "control rod" includes power control rod, regulating rod, safety rod, shim rod, scram rod and the like as will be understood by those familiar with the art. The control rod may be a fuel rod or a part of the moderator. In thermal reactors to which my invention is particularly adaptable it is commonly a neutron absorber so that the rate of reaction is reduced as more of the control rod moves into the active portion of the reactor. Such a reactor is ordinarily shut down by moving all of the control rods into the active portion of the reactor either at a controlled rate to effect a normal shutdown or at an accelerated rate to effect an emergency shutdown or to "scram" the reactor as it is ordinarily called.

While I do not intend to imply that my invention is limited to a specific type of reactor, I have found it to be particularly adaptable and advantageous to use with so-called power reactors and I have therefore chosen to illustrate and describe it specifically as applied to a Pressurized Water Reactor such as used in the Nautilus and other submarines of the United States Navy, the Shippingport and Indian Point Nuclear Power Plants and in the N/S Savannah.

A primary object of my invention is to provide a fail-safe rod drive.

Another object of my invention is to provide a rod drive which will positively move the rod to scram position with no dependence upon an auxiliary power source.

A further object of my invention is to provide a rod drive which is unaffected by motion of the reactor vessel and capable of withstanding relatively high acceleration or deceleration making it particularly suitable to reactors for marine and other mobile services.

Still another object of my invention is to provide a rod drive readily adaptable to mounting on top of the reactor vessel enhancing its attraction for marine use as the reactor vessel can then be located low in the hull giving the hull a low center of gravity.

Still another object of my invention is to provide a rod drive which does not position the rod in increments or steps but provides completely modulated operation throughout the travel of the rod.

Another object of my invention is to provide a rod drive which may be readily connected and disconnected from the control rod.

It is a further object of my invention to provide a rod drive which in a preferred form is particularly adaptable to Pressurized Water Reactors wherein the water in the Primary Loop may be used as the operating fluid and the need for a buffer seal and other auxiliary components eliminated.

Still another object of my invention is to provide a rod drive essentially quiet in operation so that it may be advantageously used in submarines and the like.

Figure 9:
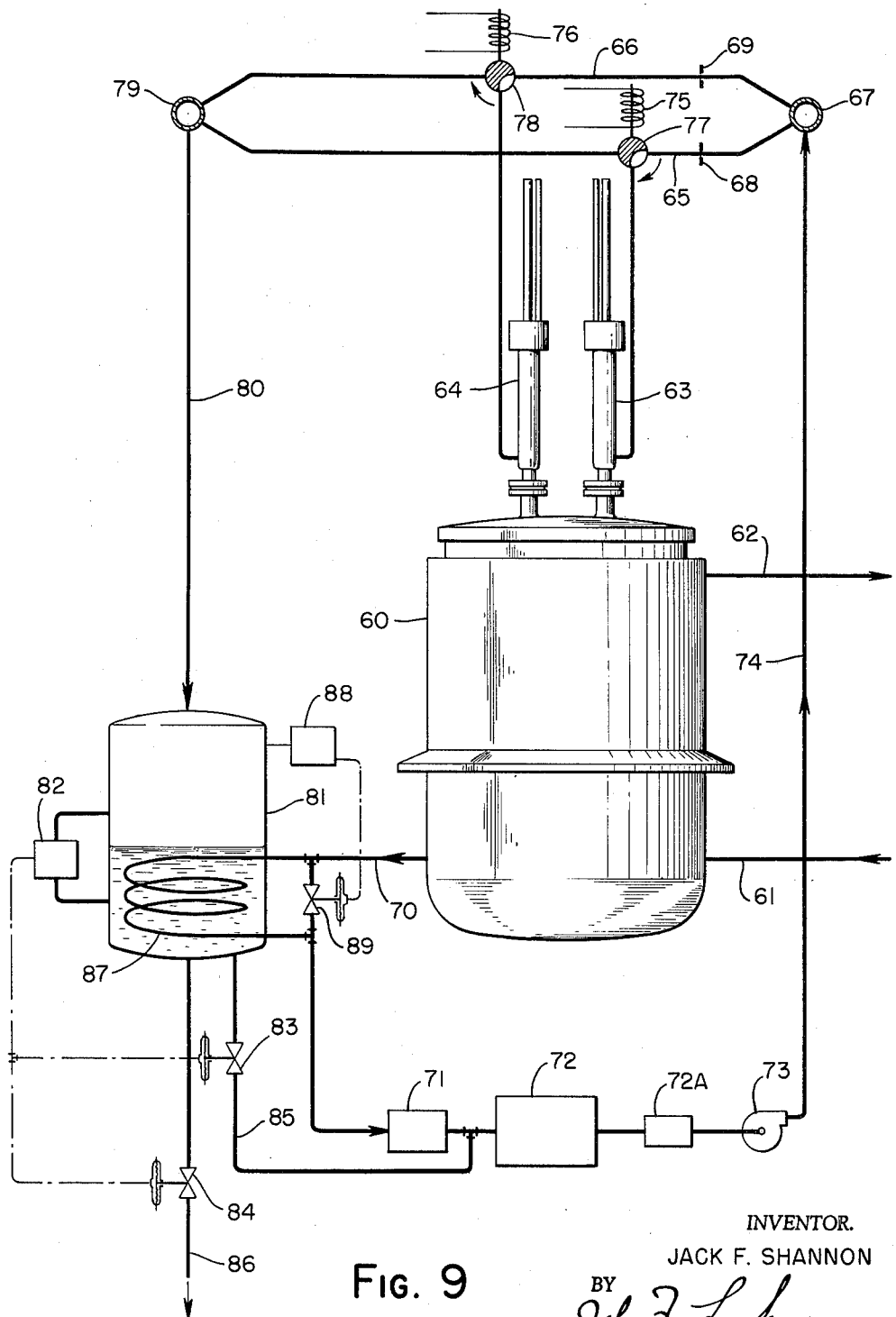

FIG. 9 diagrammatically illustrates my invention as applied to a Pressurized Water Reactor.

Figure 1:
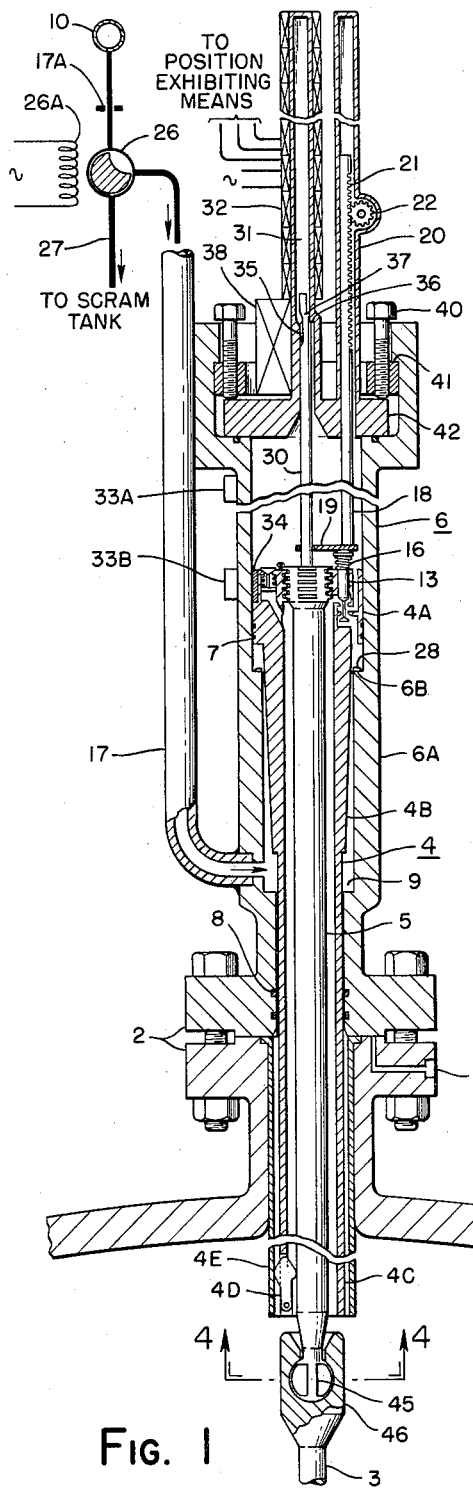
FIG. 1 is a sectionalized, broken, elevation view of a control rod drive embodying my invention arranged for mounting on top of a reactor vessel.
Figure 1A:
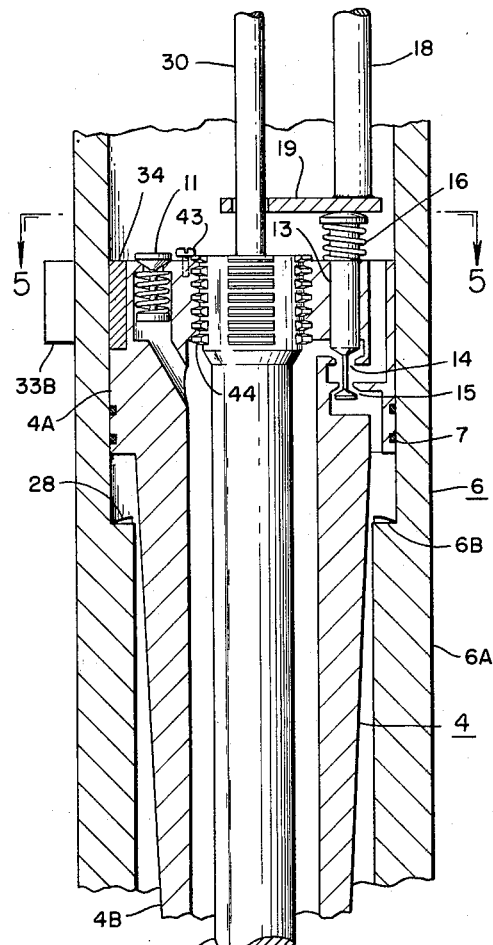
FIG. 1A is an enlargement of a part of FIG. 1 disclosing specific details of my structure in larger size.
Figure 4:
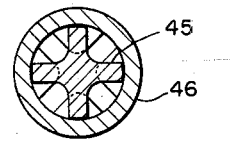
FIG. 4 is a sectional view taken in the direction of the arrows 4—4 of FIG. 1.

Referring now to FIGS. 1 and 1A I have chosen to illustrate and describe my invention applied to a Pressurized Water Reactor and I show in broken sectional elevation a control rod drive mounted on top of a reactor vessel 1 by means of flanges 2. Water under extremely high pressure fills and is circulated through the reactor vessel 1 to act as a coolant and heat transfer medium. A leak port 2A may be provided to detect any leakage of coolant through flanges 2 and provide a connection for returning such leakage to a suitable sump or other collecting means.

A control rod 3, or the extension thereof, a fragment only of which is shown, is moved relative to the active portion of the reactor by a hollow piston generally indicated at 4 and a connecting rod 5 reciprocatable within a cylinder 6. The piston 4 has a head 4A provided with piston rings or seals 7 engaging the wall of the cylinder 6, a relatively long tapered section 4B and a straight relatively long cylindrical section 4C. The piston 4 is prevented from turning in the cylinder 6 by means of a key 4D pivotally mounted on the cylindrical section 4C at the lower end thereof and normally held in a slot formed in a sleeve 4E by engagement with connecting rod 5.

The flanges 2 are provided with piston rings or seals 8. An annular chamber 9 is thus formed between the piston rings or seals 7 and 8. Into this annular chamber pressure fluid from a supply header 10 is introduced producing a force urging the piston 4 to move up proportional to the pressure and to the difference in areas of the piston head 4A and cylindrical section 4C. By hydraulic circuitry hereinafter described the pressure fluid within the supply header 10 is obtained from and maintained at a pressure above that of the coolant water within the reactor vessel 1.

Disposed in the piston head 4A is a control valve 13 biased by a spring 16 so that a port 14 is normally open and a port 15 is normally closed. Port 14 places the space above piston head 4A in communication with the interior of the reactor vessel so that the pressure above the piston head 4A is normally derived from and is substantially the same as that within the reactor vessel. The pressure within the reactor vessel in place of producing a force acting upwardly on the piston 4 as might be expected, actually produces a net force acting downwardly proportional in magnitude to the difference in the areas of piston head 4A and cylindrical section 4C. The weight of the piston 4 and parts carried thereby also urges the piston 4 downwardly.

The piston 4 is caused to remain in equilibrium at any selected position or to move up or down at a controlled speed by regulating the pressure of the fluid within the annular space 9. This is accomplished by regulating the rate of pressure fluid flow through port 15, that is the rate at which pressure fluid is discharged from the annular chamber 9, relative to the rate at which it is admitted thereto from the supply header 10. A pipe 17 connects the annular chamber 9 to supply header 10 and disposed therein is a flow restriction such as orifice 17A having a relatively high resistance to fluid flow as compared to the resistance of pipe 17 and other components which form a part of the hydraulic circuitry. By this means the fluid flow from the supply header 10 is unaffected by variations in resistance of the hydraulic circuitry. Where a single rod drive is employed the orifice 17A might be eliminated and the resistance of pipe 17 and associated components relied upon to give a substantially constant rate of fluid flow, however, where two or more rod drives are used in connection with a single reactor vessel the high resistance introduced by orifice 17A or other flow restrictive device in the supply line to each rod drive is a means for preventing usage of pressure fluid by one drive affecting the operation of any other drive.

The flow of pressure fluid from the annular chamber 9 is controlled by the control valve 13. Thus with port 15 closed all of the pressure fluid flowing into the chamber will be effective for moving the piston 4 up and hence raising the rod 3 in the reactor vessel 1. As the valve 13 is positioned downwardly relative to piston head 4A the flow from the annular space 9 through port 15 will increase causing the piston 4 to move up at a reduced speed. At some position of valve 13 relative to piston head 4A the flow through port 15 will equal the flow of pressure fluid into the annular space 9 and the piston 4 will remain stationary at its then existing position. Further opening of port 15 will cause the flow of pressure fluid therethrough to exceed that into the annular space 9 thereby causing the piston 4 to move down at a rate proportional to the opening of port 15. It is thus apparent that at a neutral position, so-called, of the valve 13 the flow into the annular chamber 9 will be equal to the flow therefrom and the piston 4 remain stationary. Displacement of the valve 13 from such neutral position will cause the piston to move at a rate proportional to the displacement and in a sense dependent upon the sense of displacement from the neutral position.

While as heretofore described the pressure above the piston head 4A remains substantially equal to that within the reactor vessel 1, it will be observed that displacement of the valve 13 downwardly causes proportionate closure of port 14 so that the pressure above piston head 4A will increase and approach that existing within the annular chamber 9 for large displacement of the valve 13 relative to piston head 4A and will, with port 14 closed be equal thereto. Thus the force normally available to produce downward movement of piston 4 may be materially increased by a large displacement of the valve 13 downwardly relative to piston head 4A. Such increase in force is useful in overcoming temporary sticking of the piston 4 or control rod 3 which may be encountered under unusual circumstances. Usually the control rod 3 moves into the reactor, or downwardly as shown in FIGS. 1 and 1A to reduce the rate of reaction, and it is imperative, to prevent runaway conditions, that ample power be available to position the piston 4 downwardly. This I provide by port 14 which materially increases the force urging the piston 4 downwardly when closed or nearly closed.

Figure 2:
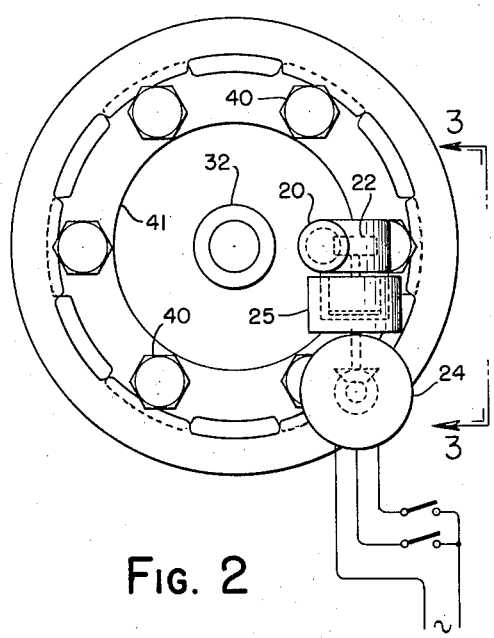
FIG. 2 is a top view of the rod drive shown in FIG. 1.
Figure 3:
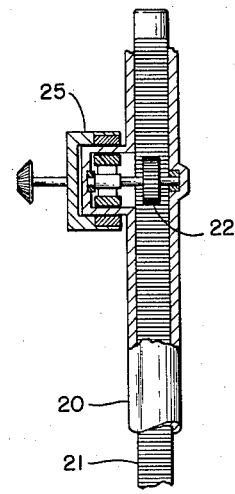
FIG. 3 is a fragmentary view, partially in section, of the rod drive shown in FIGS. 1, 1A and 2 taken in the direction of the arrows 3—3 of FIG. 2.

I provide a positioner rod 18 having a guided foot 19 arranged to engage the upper face of the valve 13 to control the positioning thereof and consequently the movement of the piston 4. The positioner rod 18 is contained within a tube 20 and is provided with a rack 21 engaging a drive pinion 22. As shown more clearly in FIGS. 2 and 3 the drive pinion 22 may be positioned by any suitable externally mounted means such as a reversing motor 24 and a magnetic coupling 25, the latter eliminating the necessity for a pressure seal which would otherwise be required with an externally mounted means for driving the pinion 22. As the positioner rod 18 is raised through operation of the motor 24 valve 13 will move to increase the opening of port 14 and decrease the opening of port 15 thereby causing piston 4 to move up. Conversely as the positioner rod 18 is lowered through the agency of motor 24, valve 13 will move to decrease the opening of port 14 and increase the opening of port 15 causing piston 4 to move down. Thus the piston 4 and control rod 3 "follow" the movements of positioner rod 18. As apparent to those skilled in the art the motor 24 may be controlled either manually or automatically to adjust the position of the rod 3 as may be required, for example, to maintain the reactor at a predetermined level of operation.

Under certain conditions it is important that the control rod be moved into the reactor as rapidly as possible and yet care taken during such rapid insertion not to damage the reactor or rod. Such emergency operation should be accomplished without the necessity of relying upon an outside source of power, that is to say, it should be a "fail-safe" operation. To cause the rod 3 to rapidly drop into the reactor under emergency conditions or to "scram" the reactor as it is commonly called I provide a 3-way valve 26 in pipe 17 operated by a solenoid coil 26A. As shown the valve 26 is in the operating position with solenoid coil 26A energized. Deenergization of solenoid coil 26A connects pipe 17 with an exhaust line 27. Consequent loss of pressure in annular chamber 9 will cause the piston 4 to fall. Substantial equlization of the pressure above piston 4 with that in the reactor vessel 1 is affected by port 14 being wide open thereby permitting the free flow of coolant between the reactor vessel 1 and the space above the piston head 4A. Assuming however, that the port 14 is of insufficient area to cause such equalization, and the pressure above the piston head 4A tends to decrease below that in the reactor vessel 1, a relief valve such as shown at 11 may be provided to afford greater port area and maintain equalization of the pressures. With the pressure above piston head 4A equal to the pressure within the reactor vessel 1 a downward acting force is produced as heretofore described by virtue of the fact that the pressure above the piston head 4A acts on the entire area of piston head 4A whereas the pressure within the reactor vessel 1 acts only on the area of the cylindrical section 4C. Thus the pressure within the reactor vessel is utilized as the primary force for scramming the reactor normally assisted by the weight of the piston 4 and parts carried thereby. However, the unbalance in forces produced by the reactor pressure acting on both sides of piston 4 is sufficient in and of itself to cause movement of the rod 3 into the reactor at the acceleration and velocity required to safely scram the reactor.

Damage to the reactor or rod 3 is prevented by decelerating the rod 3 as it approaches the end of its travel. This I accomplish by providing cylinder 6 with a lower section 6A having a reduced area and forming a shoulder 6B. As the tapered piston section 4B moves into the lower section 6A a diminishing port area is formed with shoulder 6B thereby throttling the flow of pressure fluid into exhaust line 27. To further provide against shocks as the piston 4 reaches downward limit of travel a snubber spring such as I show at 28 may be provided.

Figure 5:
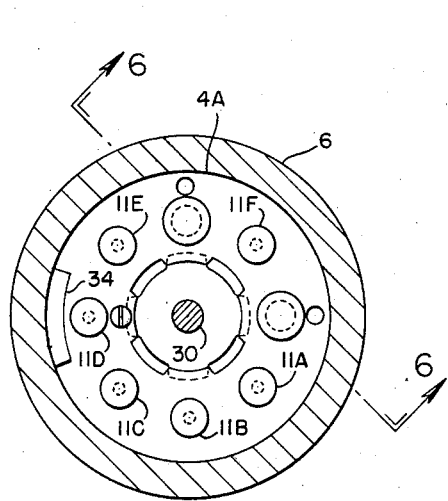
FIG. 5 illustrates a modification of a detail of the piston shown in FIG. 1.
Figure 6:
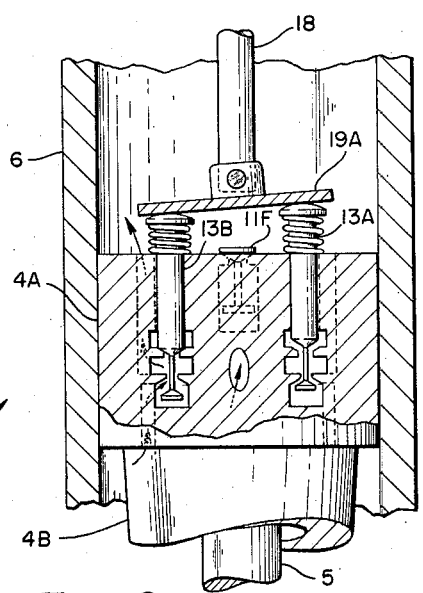
FIG. 6 is a sectional elevation view taken in the direction of the arrows 6—6 of FIG. 5.

While it is a feature of my invention to utilize the highly purified coolant fluid circulating through the reactor vessel 1 as the pressure fluid to operate my rod drive and thus improve its reliability as compared to other types of drives, under certain conditions the coolant may become contaminated with foreign material which if lodging on the valve 13 may cause it to stick thereby preventing the "follow-up" operation of piston 4 with respect to positioner rod 18. In FIGS. 5 and 6 I show an arrangement whereby the possibility of such sticking affecting the proper follower action is materially reduced by providing two control valves 13A and 13B. With this arrangement a foot 19A is provided which is pivoted at the end of positioner rod 18. Normally the foot 19A will effect equal operation of valves 13A and 13B; however, if one or the other sticks, the one sticking will act as fulcrum about which the foot 19A will pivot and the other control valve will continue to operate in normal manner.

In FIGS. 5 and 6 I have also shown a modification wherein the piston head 4A is provided with multiple relief valves 11A–11F to afford greater port area for the flow of coolant between the reactor vessel 1 and space above the piston head 4A thereby assuring that the pressure therein is never materially less than that in the reactor vessel 1.

As shown in FIG. 1 the position of the control rod 3 may be determined and an indication thereof transmitted to any suitable exhibiting means through the provision of a movable core transformer. To this end I provide a magnetic type stainless steel rod 30 which is secured to piston head 4A and moves in a non-magnetic stainless steel tube 31 thereby varying the magnetic coupling with the secondary coils of a transformer 32 excited by a primary winding energized from a suitable source of A.-C. Predetermined positions of the rod 3 may also be detected by suitable sensing means such as proximity magnetic switches which I have diagrammatically indicated at 33A and 33B operating in conjunction with a magnet 34 located in the piston head 4A.

When the rod 3 moves to scram position it is desirable that it be locked in position to prevent movement until it is determined that operation of the reactor may be safely resumed. Such lock down I accomplish by a spring 35 which forces a shoulder 37 on rod 30 under a shoulder 36 in tube 31 when rod 3 reaches scram position. Upward movement of rod 3 is thereby prevented until disengagement of the shoulders is effected through energization of a suitable magnet coil 38.

It is further desirable that the rod drive be readily separated from the control rod to permit removal of the head of the reactor vessel 1 for refueling, replacement of control rods, inspection of the reactor vessel, etc. This may be accomplished by loosening clamp bolts 40 and rotating a clamp ring 41 approximately 30°. This permits cylinder head 42 to be lifted and removed from cylinder 6. Connecting rod clamp screw 43 (FIG. 1A) is then loosened and connecting rod 5 turned approximately 20°. As shown connecting rod 5 is held in piston head 4A by zero pitch interrupted threads such as shown at 44 and the 20° rotation releases connecting rod 5 and control rod 3 from piston head 4A so that they then drop until supported within the reactor. As shown in FIG. 1 connecting rod 5 is joined to control rod 3 through a ball and socket joint comprising a ribbed ball 45 and slotted socket 46. By rotating connecting rod 5 an additional 25° the ribs of ball 45 are aligned with the slots in socket 46 so that the connecting rod 5 may then be raised, leaving the control rod 3 resting in the reactor. Removal of connecting rod 5 allows key 4D to fall inwardly so that the entire drive assembly may then be removed.

Figure 7:
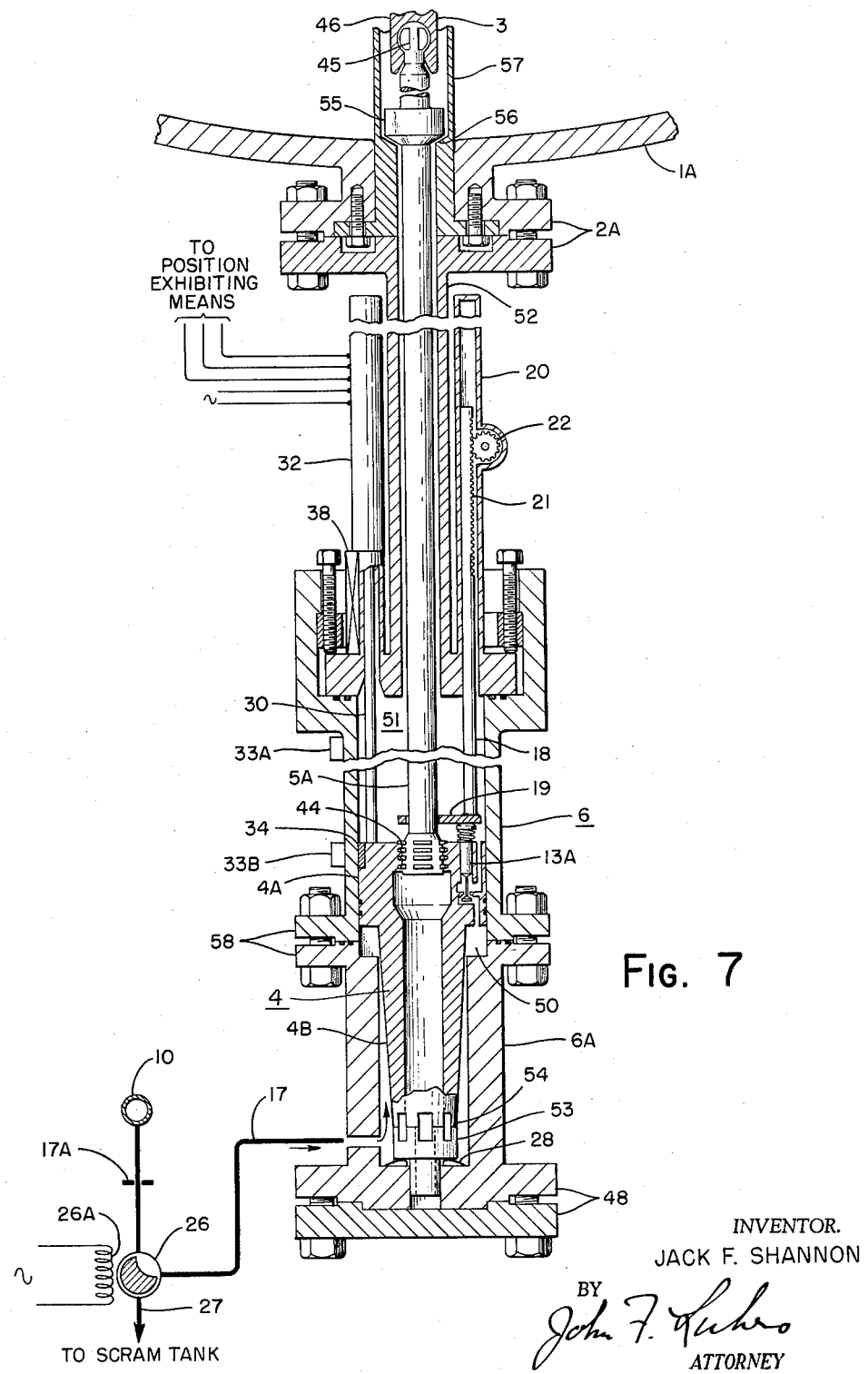
FIG. 7 is a sectional elevation view of a rod drive embodying my invention arranged for mounting on the bottom of a reactor vessel.

In FIG. 7 I show a modified form of rod drive arranged for mounting on the bototm of a reactor vessel 1A to which it is held by means of flanges 2A. The control rod 3 is sufficiently long that, as with the arrangement shown in FIG. 1, the reaction rate of the reactor is moderated upon downward movement of the control rod. In the scram position the control rod will be at the lowermost point in its normal travel, the position illustrated in FIG. 7. The control rod is caused to move up by upward positioning of the positioner rod 18. This causes a control valve 13A to move up relative to piston head 4A thereby decreasing the flow of pressure fluid from a cylinder chamber 50 below the piston head 4A to a cylinder chamber 51 above piston head 4A and accordingly increasing the pressure in cylinder chamber 50 acting upwardly on piston head 4A. Cylinder chamber 51 is in communication with reactor vessel 1A through a cylinder extension 52 housing a connecting rod 5A. Conversely control rod 3 is caused to move down by positioner rod 18 moving downwardly. This causes control valve 13A to increase the flow of pressure fluid between chambers 50 and 51 thereby decreasing the pressure in chamber 50. With the positioner rod 18 stationary the piston head 4A will likewise remain stationary as the control valve 13A will be brought to a neutral position when the flow of pressure fluid from chamber 50 to chamber 51 will be maintained at that required to establish an upward force against piston head 4A balancing the downward force produced by the reactor pressure and the weight of piston 4 and parts carried thereby. It is apparent therefore, that piston head 4A and control rod 3 will at all times "follow" the movement of positioner rod 18.

The rod drive is disconnected from the control rod 3, in the embodiment shown in FIG. 7, by breaking flanges 48 and rotating end piece 53 carried by tapered section 4B so that square teeth 54 mesh rather than standing end to end. This permits piston 4, connecting rod 5A, and rod 3 to drop until a collar 55 engages a mating shoulder 56 in a sleeve 57. Flanges 58 are then broken and piston 4 may be removed by rotating it sufficiently to disengage the zero pitch interrupted threads 44. Thereafter connecting rod 5 may be removed by breaking flanges 2A, rotating the connecting rod so that the ribs of ball 45 are aligned with the slots in socket 46 and removing sleeve 57.

Figure 8:
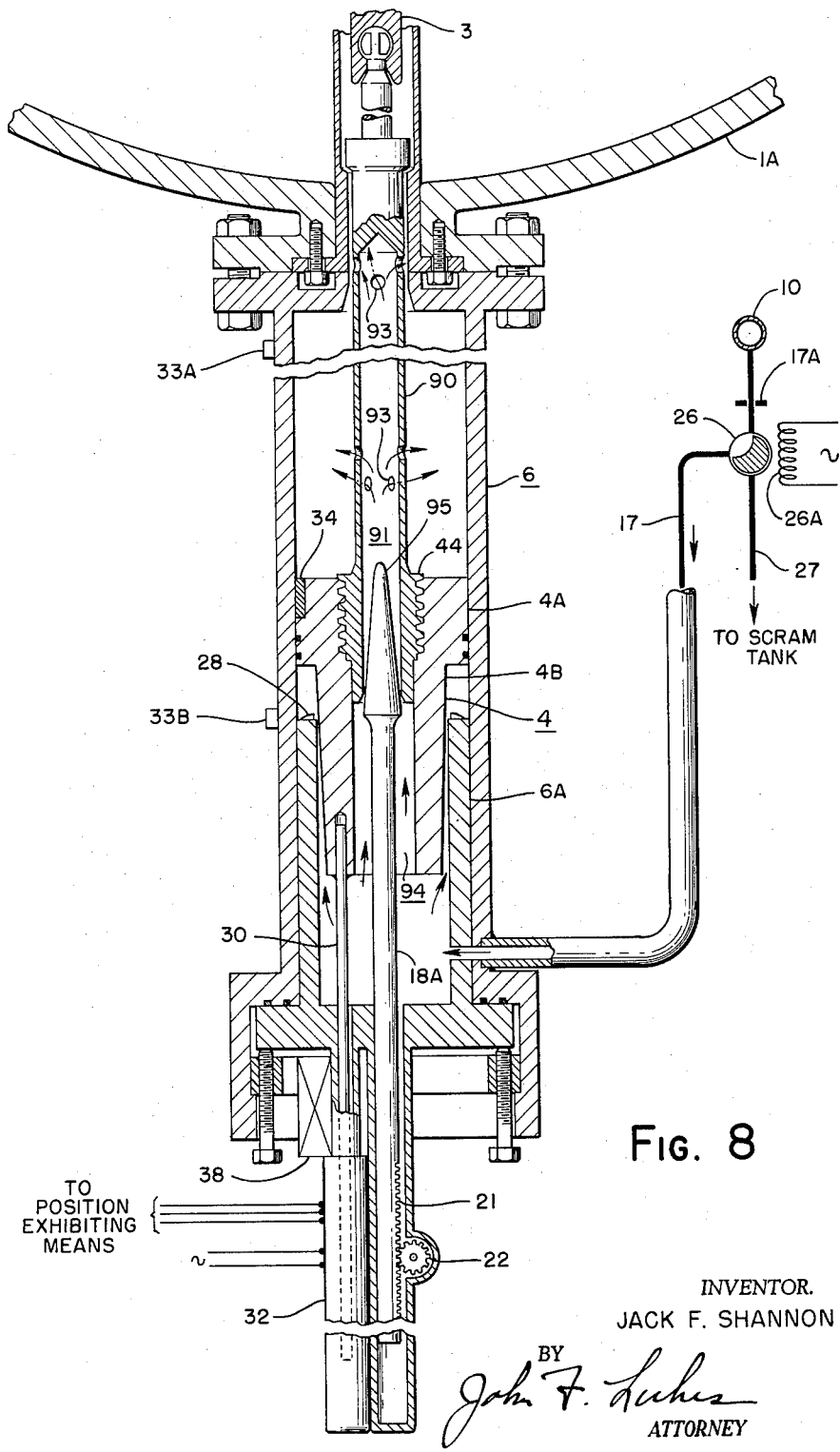
FIG. 8 is a sectional elevation view of a modified form of a rod drive embodying my invention also arranged for mounting on the bottom of a reactor vessel.

In FIG. 8 I show a further modification of the rod drive also suitable for mounting below a reactor vessel. Therein the control rod 3 is carried by a connecting rod 90 detachably secured in piston head 4A by means of the zero pitch interrupted threads 44. The lower portion of connecting rod 90 is hollow to form a passageway as shown at 91. The passageway 91 communicates through ports 93 with the interior of cylinder 6 above piston head 4A which space is in free communication with the interior of reactor vessel 1A. Aligned with passageway 91 is a passageway 94 in piston 4 opening at its lower end to the interior of cylinder 6.

Pressure fluid from supply header 10 is introduced into the interior of cylinder 6 below piston 4 and it will be apparent from an inspection of FIG. 8 that pressure fluid would pass upwardly through passageway 94 and 91, through ports 93 into reactor vessel 1A. Assuming such uncontrolled flow substantially equal pressures will exist above and below piston 4 which by gravity would move down carrying the control rod 3 into the active portion of the reactor. The flow through passageway 91 is however normally controlled by a positioner rod 18A shaped at its upper end to form a valve member 95 cooperating with passageway 91 to form an annular orifice having a variable area in dependence upon their relation positions. The positioner rod 18A is vertically moved through rack 21 and pinion 22. The piston 4 will follow the movement thereof by virtue of the variable restriction to fluid flow formed by the valve member 95 in passageway 91. Thus as the resistance increases the pressure below piston head 4A will increase and the corresponding increase in differential pressure across piston head 4A will cause the piston 4 and control rod 3 to move up until the force produced by the differential pressure is just sufficient to counterbalance the downward force acting on piston 4. As will be readily appreciated by those familiar with the art, the valve member 95 may be shaped so that the velocity of piston 4 will be in direct proportion, or bear a desired non-linear functional relation to the position of valve member 95 relative to passageway 91.

Upon deenergizing of coil 26A solenoid valve 26 will operate to place the interior of cylinder 6 below piston head 4A in communication with exhaust line 27, thereby causing the rod 3 to rapidly drop into the reactor and to "scram" the reactor as it is commonly called. As valve member 95 moves entirely into passageway 91 flow from above to below the piston head 4A is substantially reduced so that the pressure within the reactor vessel is effective to urge the piston 4 downwardly against substantially zero pressure below the piston head 4A. Deceleration of the rod 3 as it approaches its lower limit of travel is obtained through the provision of tapered piston section 4B and snubber spring 28 as heretofore described.

In FIG. 9 I show in schematic and simplified form typical hydraulic circuitry for obtaining the pressure fluid for operating one or more control drives. Therein I show a Pressurized Water Reactor 60 through which coolant water is circulated under high pressure by means of an inlet conduit 61 and discharge conduit 62. These conduits, as well understood, usually form part of the Primary Loop, so-called, in which is located a suitable heat exchanger and pumping means (not shown). Present practice calls for maintaining an operating pressure of approximately 1500 p.s.i. in the Primary Loop and an operating temperature of approximately 650° in the reactor.

While a reactor such as the reactor 60 may be provided with any number of control rods and rod drives therefor, for purposes of illustration, I have shown rod drives 63 and 64 which are connected by pipes 65 and 66 to a pressure fluid supply header 67. Flow control orifices 68 and 69 provide a sufficient pressure drop so that operation of one control drive does not affect operation of the other control drive.

Pressure fluid for operating control drives 63 and 64 is obtained by continuously withdrawing coolant water from the reactor 60 through a pipe 70, passing the water so withdrawn through a cooler 71, deionizer 72, filter 72A and booster pump 73 from whence it is discharged into supply header 67 through a pipe 74. It will be appreciated that by proper selection of booster pump 73 the pressure in supply header 67 can be maintained a substantially constant amount in excess of that in the reactor 60 regardless of the rate of usage by rod drives 63 and 64. In the alternative a suitable differential pressure control may be employed as will be well understood by those familiar with the art.

The reactor 60 is scrammed by deenergizing solenoid coils 75 and 76 of 3-way valves 77 and 78 respectively. Pressure fluid from the control drive 63 and 64 is then discharged into an exhaust header 79 and from there through a pipe 80 into a scram tank 81. A predetermined liquid level is maintained therein by level controller 82 operating oppositely acting valves 83 and 84. That is to say as valve 83 closes valve 84 opens and vice versa. As valve 83 opens cooled reactor water is admitted into scram tank 81 by way of pipe 85. As valve 84 opens water is discharged from the scram tank 81 through a pipe 86 to any suitable disposal point (not shown).

Scram tank 81 is maintained at a predetermined pressure and temperature by by-passing some of the coolant water withdrawn from reactor 60 through a coil 87. A pressure controller 88 operating a valve 89 controls the amount of coolant water passing through the coil to maintain the desired pressure in the scram tank by maintaining the coolant water therein at the saturation temperature corresponding to the desired pressure. Scram tank 81 is of sufficient size and the pressure therein maintained sufficiently below that existing in the reactor 60 so that upon the reactor being scrammed it may readily receive all of the pressure fluid discharged at a relatively high rate of flow from control drives 63 and 64 with no appreciable increase in pressure.

It will be recognized by those versed in the art that various modifications may be made to the control rod drive herein described without departing from the teachings of my invention. Accordingly it is intended that the scope of the invention be limited only by the following claims and not by the details necessary in applying my invention to a particular reactor.

What I claim as new and desire to secure by Letters Patent of the United States is:

1. A fluid drive for a control rod of a reactor containing a pressurized fluid comprising a vertical cylinder, a piston slidably mounted in said cylinder, a pressure transmitting connection between the reactor and the cylinder above said piston, a connecting rod operatively connecting said piston to the control rod, the weight of said piston and piston rod and the pressure on top of said piston urging said piston downwardly toward the lower end of said cylinder, a source of the pressurized fluid under a higher pressure than the reactor pressure, a restricted passageway from said source to the interior of said cylinder between said piston and the lower end of said cylinder whereby the pressure fluid urges said piston upwardly toward the upper end of said cylinder, a passageway through the piston and a valve in the passageway for controlling the flow of pressure fluid therethrough to thereby control the pressure of the fluid below the piston and accordingly the force urging said piston upwardly.

2. Apparatus for controlling a nuclear reactor of the type having a coolant under pressure circulated therethrough and a control rod positionable in said reactor for controlling the rate of nuclear reaction, comprising in combination, a vertical cylinder, a piston slidably mounted in said cylinder, a connecting rod operatively connecting said piston to the control rod, the weight of said piston and connecting rod urging said piston downwardly toward the lower end of said cylinder, a connection into said reactor for withdrawing coolant therefrom, a booster pump in said connection for increasing the pressure of the coolant, a restricted connection from the outlet of said pump to said cylinder below said piston whereby said piston is urged upwardly by said coolant, a connection from said cylinder above said piston into said reactor, a passageway through said piston; and valve means in said passageway for controlling the flow of coolant from the lower to the upper side of said piston to thereby control the positioning of the control rod in the reactor.

3. Apparatus for controlling a nuclear reactor of the type having a coolant under pressure circulated therethrough and a control rod positionable in said reactor for controlling the rate of nuclear reaction, comprising in combination, a vertical cylinder, a piston slidably mounted in said cylinder, a connecting rod carried by said piston for connection to the control rod, means for producing a source of coolant at a higher pressure than the pressure within the reactor, a first connection from said cylinder above said piston into said reactor, a second connection from said source to said cylinder below said piston, an exhaust port comprising a passageway through said piston for discharging coolant from the cylinder below said piston; and means for varying the relative resistances to fluid flow of said second connection and said exhaust port to thereby cause said piston to move up, remain stationary, or move down.

4. The combination of claim 3 wherein the means for varying the relative resistances to fluid flow through the second connection and exhaust port includes a movable valve member located in said passageway.

5. The combination of claim 4 including means normally biasing said valve member to a closed position to thereby cause said piston to move in one direction.

6. The combination of claim 5 including a positioner rod arranged to engage and open said valve to partially relieve the pressure below said piston to thereby cause said piston to maintain a position corresponding to the position of the positioner rod.

7. A fluid drive for positioning a control rod into and out of a reactor vessel through which a fluid coolant is circulated under pressure, comprising in combination, a compound piston having opposed spaced apart piston heads of different areas operatively connected to the control rod, a cylinder housing said compound piston, means for introducing the fluid coolant into said cylinder on opposite sides of said compound piston to thereby produce a force urging said compound piston in one direction, means for establishing a supply of the fluid coolant at a pressure greater than the pressure of the fluid coolant in the reactor vessel, a connection from said supply of fluid coolant into said cylinder between said opposed piston heads to thereby produce a force urging said compound piston in the opposite direction; and means for controlling the pressure of the fluid coolant in said cylinder between said opposed piston heads to thereby regulate the positioning of said piston and control rod.

8. The combination of claim 7 wherein the fluid coolant introduced into said cylinder on opposite sides of said compound piston produces a net force urging said compound piston and control rod in a direction to shut down the reactor.

9. The combination of claim 7 wherein the means for controlling the pressure of the fluid coolant in the cylinder between the opposed piston heads includes a passageway through one of said piston heads and a control valve in said passageway.

10. In a fluid drive for positioning a control rod into and out of a reactor vessel, the combination comprising, a compound piston having opposed piston heads of different areas operatively connected to the control rod and a truncated cone section separating the opposed heads to form an annular space between said opposed head, a cylinder having a first section slidably mounting the piston head of larger area and a second section slidably mounting the piston head of lesser area, said first and second sections forming a shoulder at their meeting ends, said truncated cone section cooperating with said shoulder to form a variable restriction to fluid flow into and out of the annular space as said piston moves in said cylinder.

11. A reactor control rod drive for mounting on top of a pressurized reactor through which a fluid coolant is circulated under pressure adapted to vertically position a control rod into and out of the reactor vessel, comprising in combination, a vertical piston having a cylindrical tail section extending into the reactor vessel and a piston head of greater diameter than said tail section, a vertical cylinder slideably mounting said piston head having a lower end portion mounted on and opening into said reactor vessel slideably mounting said tail section to thereby provide an annular chamber between the piston head and lower end portion, a connecting rod operatively connected to said tail section for connection to the reactor control rod, a first passageway through said piston whereby the pressure in the reactor vessel is effective on the top of the piston head to produce a net force urging said piston downwardly and the control rod into the reactor, means for establishing a supply of the fluid coolant at a pressure greater than the pressure of the fluid coolant in the reactor vessel, a first connection from said supply of fluid coolant into said annular chamber to thereby produce a force urging said piston upwardly, a second connection for discharging fluid coolant from said annular chamber, and means for adjusting the flow of fluid coolant through said second connection to a value less than, equal to or greater than the flow of fluid coolant to said annular chamber to thereby cause the piston to move up, remain stationary, or move down.

12. The combination of claim 11 wherein said second connection is a second passageway between the annular chamber and the reactor vessel.

13. The combination of claim 12 wherein the first and second passageways are disposed at least in part in the piston head.

14. The combination of claim 13 wherein the means for adjusting the flow through said second passageway is a movable valve member mounted in the piston head.

15. The combination of claim 14 wherein the valve member is normally biased to close the second passageway to cause said piston to move upwardly and a movable positioner rod is arranged to engage and open said valve and thereby cause said piston to assume a position corresponding to the position of said positioner rod.

References Cited in the file of this patent
UNITED STATES PATENTS

| | | |
|---|---|---|
| 2,499,889 | Teichmann | Mar. 7, 1950 |
| 2,880,155 | Lichtenberger et al. | Mar. 31, 1959 |
| 2,937,984 | Chapellier | May 24, 1960 |
| 2,990,356 | Chapellier, et al. | June 27, 1961 |

OTHER REFERENCES

Schultz: Control of Nuclear Reactors and Power Plants, McGraw-Hill (1955), pp. 109–112.